Oct. 16, 1934.  R. F. DIRKES ET AL  1,977,120
OPTICAL SYSTEM FOR TICKER TAPE PROJECTORS
Filed May 27, 1931  2 Sheets-Sheet 1
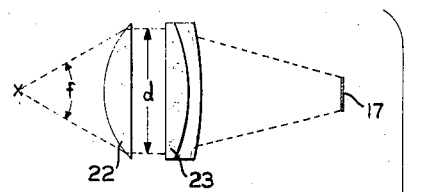
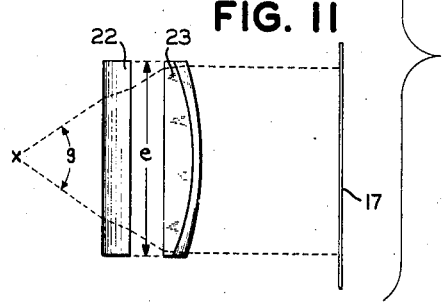
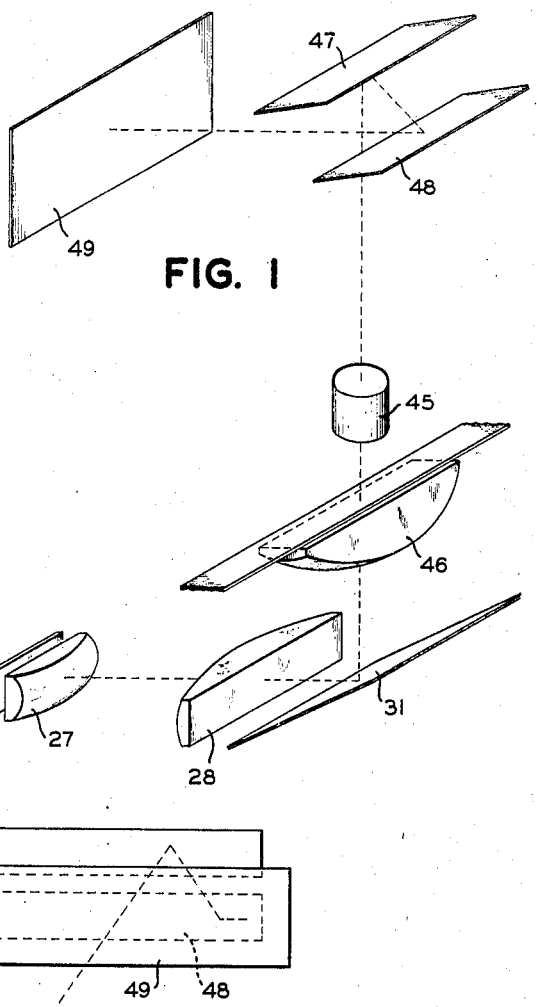
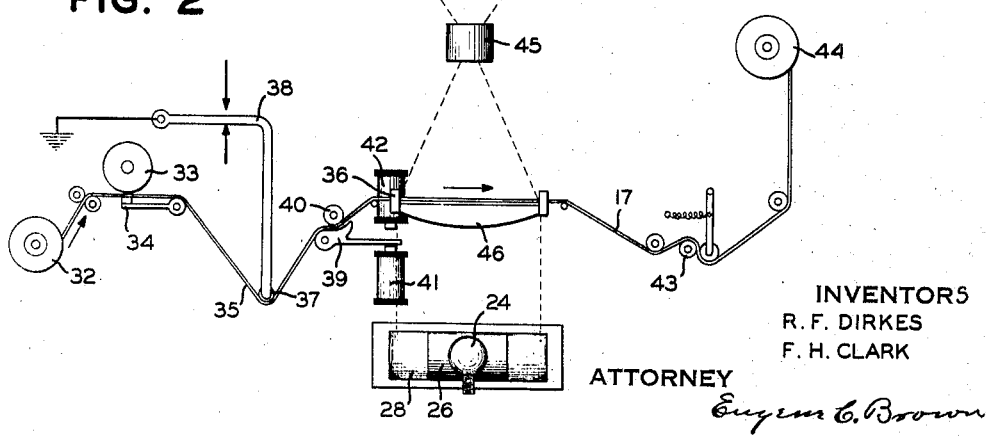
INVENTORS
R. F. DIRKES
F. H. CLARK
ATTORNEY
Eugene C. Brown Oct. 16, 1934.  R. F. DIRKES ET AL  1,977,120
OPTICAL SYSTEM FOR TICKER TAPE PROJECTORS
Filed May 27, 1931   2 Sheets-Sheet 2
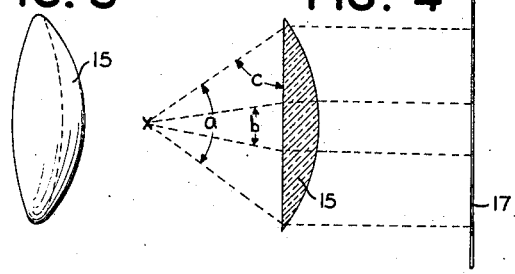
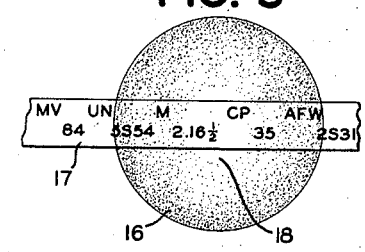
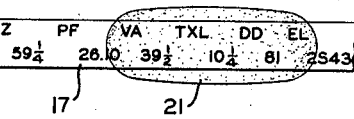
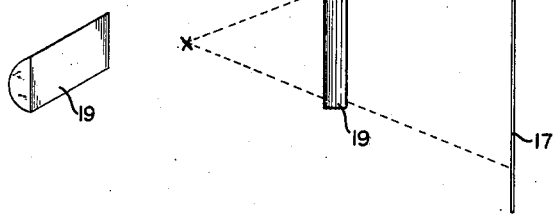
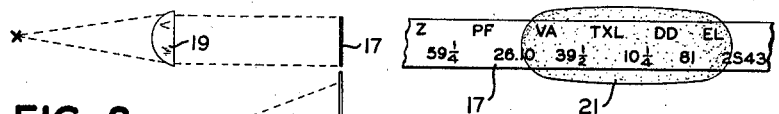
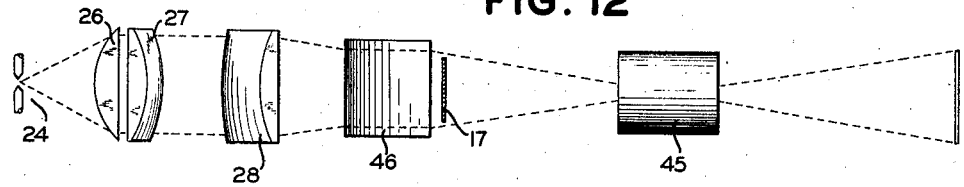
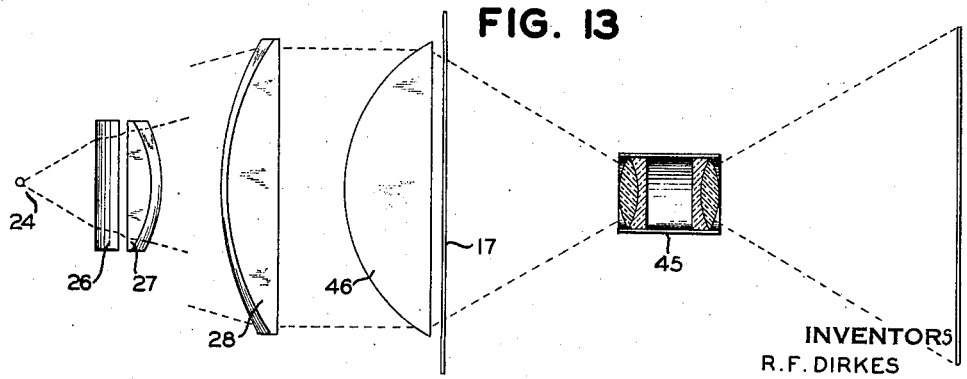
INVENTORS
R. F. DIRKES
F. H. CLARK
BY their ATTORNEY Patented Oct. 16, 1934

1,977,120

UNITED STATES PATENT OFFICE 1,977,120

OPTICAL SYSTEM FOR TICKER TAPE PROJECTORS

Robert F. Dirkes, Jamaica, and Frances H. Clark, New York, N. Y., assignors to The Western Union Telegraph Company, New York, N. Y., a corporation of New York Application May 27, 1931, Serial No. 540,474

4 Claims. (Cl. 88—24)

This invention relates to a projector for ticker tape and more particularly to an optical system for obtaining satisfactory illumination of a long length of tape and projection thereof on to a screen in enlarged characters.

In stock ticker tape projectors, now in commercial use, the length of tape projected at any instant is approximately five inches. The width of the tape is approximately three-quarters of an inch. Preferably it is composed of cellophane or other transparent or translucent material. In order to obtain a distinct image on the screen of the characters appearing on the tape, it is essential that the tape be illuminated evenly and brilliantly throughout its entire length. Heretofore, difficulty has been experienced in obtaining the required degree of illumination of the tape. Various methods have been proposed.

Obviously, if an ordinary spherical condensing lens is employed between a point source of light and the tape, having a field wide enough to include the entire five inch length of the tape, the major portion of the light collected by the lens will fall to either one side or the other side of the tape and will be wasted. That is, the tape will extend in a narrow band across the center of a large circular illuminated area. Moreover, with such systems the intensity of the light falls off very rapidly towards the outer edge of the illuminated area so that the illumination at the ends of the tape is not as intense as that at the center.

The concentrated filament projection lamp employed as the light source, develops a large amount of heat and since the printing tickers are arranged as closely to the projecting system as possible, in order to reduce the lag between printing of the quotations and their appearance on the screen, it is desirable to employ a light source of the lowest intensity consistent with proper illumination in order to reduce the heat effect upon the printing mechanism. Excessive heat of the printer naturally impairs its operation.

It has been proposed to employ a number of spaced light sources and separate lens systems for projecting the image from the tape but such systems do not increase the efficiency of the illumination and have the disadvantage that the heat produced is excessive and the images projected by the separate systems may overlap or be unevenly spaced.

One of the objects of the present invention is to produce an illuminating system for a long length of a ticker tape or similarly shaped object of much greater efficiency than heretofore obtained.

Another object is to evenly and brilliantly illuminate the entire projecting length of the tape.

A further object is to provide an illuminating beam having a cross sectional form approximating that of the tape to the projected.

A still further object is to produce an illuminating system for a ticker tape projector which will cause the light ordinarily wasted at either side of the tape to be concentrated upon the tape.

Other objects and advantages of the invention will hereinafter appear.

In accordance with our invention we employed, between the point light source and the tape, either alone or in combination with other lenses, a lens having a cylindrical surface, arranged with the axis of the cylinder, of which the lens forms a part, parallel to the line of travel of the tape, the lens being convex in planes normal to the surface of the tape. The light rays which diverge outwardly from the point source having components longitudinally of the tape pass through the lens with their direction substantially unchanged thus diverging to illuminate the full length of the tape whereas the rays having components transverse of the tape are converged by the lens on to the tape to concentrate the light thereon. The cylindrical lens serves to produce a substantially elliptical beam which conforms quite closely to the shape of the length of tape being projected.

Additional condensing lenses, mirrors, etc., may be employed for directing the elliptical beam upon the tape and for projecting the image upon the screen. For instance, we may employ a convex lens of either spherical or cylindrical form immediately preceding the tape for converging the image upon the objective lens system so as to enable a wider angle of projection to be obtained. These and other features of the invention will be more fully disclosed with reference to the accompanying drawings in which:

Figure 1 is a diagrammatic view representing a side elevation of a projection system embodying our invention.

Figure 2 is a diagrammatic view representing a front elevation of the projecting system.

Figure 3 is a perspective view of an ordinary spherical condensing lens.

Figure 4 is a sectional view thereof showing the path of the light rays.

Figure 5 represents the illuminated field and the portion thereof occupied by the object to be projected.

Figure 6 is a perspective view of a cylindrical lens employed in our improved system.

Figure 7 is an end view thereof showing the path of the components of the light source which are transverse to the tape.

Figure 8 is a plan view of the cylindrical lens showing the path of the rays having components longitudinally of the tape.

Figure 9 represents the shape of the illuminated field of the cylindrical lens, with relation to the ticker tape.

Figures 10 and 11 are views corresponding to those of Figures 7 and 8, but showing a combination of a spherical and a cylindrical lens, and Figures 12 and 13 are similar views showing the complete lens system in its preferred form.

Referring to Figures 3, 4 and 5, which represent the usual form of illuminating arrangement employed in tape projectors, the light from a point source X, which is approximated in a concentrated filament incandescent lamp, is collected over an angle "$a$" by the spherical lens 15 and projected in a circular beam 16 on to the ticker tape 17. The lens 15, in order to illuminate the entire length of the tape to be projected at any instant, ordinarily has a diameter of from 5½ to 6 inches. The major portion of the light collected by the lens falls to one side or the other of the tape and is wasted. Transversely of the tape only that portion of the light included within the small angle "$b$" is directed on to the tape. Moreover, the light which does fall upon the tape is of greater intensity over the central area 18 than at the ends of the tape. This is evident when it is recalled that the light incident to an object at an angle "$c$" is equal to the light normal to the surface times the cosine of the angle "$c$". The amount of light collected by a unit area at the outer portion of the lens 15 will therefore always be less than that falling upon the central portion thereof, so that even illumination of the tape is not secured.

Referring now to Figures 6 to 9 which disclose one feature of the present invention, Figure 7 shows an end view of a lens 19 formed from a portion of a cylinder. It will be apparent that the rays of light diverging from the light source X in planes which intersect the tape 17 transversely thereof are condensed on to the tape while those diverging in planes longitudinally of the tape, as shown in Fig. 8, are only refracted slightly by the lens but do not have their angle of divergence materially altered. From such rays the lens 19 acts like two plane parallel surfaces. The resultant beam of light therefore is condensed in one direction but not in the other and assumes an elliptical shape as shown at 21 corresponding in general to the shape of the length of tape to be projected. The cylindrical lens enables the entire length of tape to be illuminated with a lens of small dimensions.

However, in order to obtain a greater intensity of illumination we prefer to employ a cylindrical lens of relatively large size to collect a greater amount of light, in combination with a spherical lens which concentrates the light upon the tape.

In Figs. 10 and 11 a cylindrical lens 22 is shown in side and plan views respectively in combination with a spherical lens 23. The lenses 22 and 23 have a vertical dimension "$d$" considerably greater than the width of the tape 17 and a length "$e$" approximately that of the length of the tape to be projected. With this arrangement it will be noted that the light collected over a relatively wide vertical angle "$f$" is concentrated by the combined action of both lenses 22 and 23 into a narrow band upon the tape 17 whereas the light collected over the horizontal angle "$g$" is condensed only by the spherical lens 23 and therefore serves to illuminate the full length of the tape. Therefore substantially all of the light falling upon the lens 12 is concentrated upon the tape.

It is obvious that if the lens 22 is at the same area as that of the spherical lens 15 of Fig. 4 and equally spaced from the light source, several times more light will be directed upon the tape with the combined cylindrical and spherical lenses than with the spherical lens alone.

In Figs. 1 and 2 we have shown the complete optical system for a tape projector constructed in accordance with a preferred embodiment of the invention. The path of the rays in both vertical and horizontal planes is represented in Figs. 12 and 13.

The light from an incandescent lamp or other suitable light source 24 having a reflector 25 associated therewith, is collected by a cylindrical lens 26, of rectangular or bar shape on its major plane surface, to produce an elliptical beam of light. Adjacent the lens 26 is a portion of a spherical lens 27 of similar dimensions. The lens 27 may be separate from the lens 26 or the lenses 26 and 27 may be formed from one piece.

The present system is designed to project a length of tape approximately 50% greater than systems now in use or a total length of about 7½ inches, although obviously either longer or shorter lengths of tape may be projected. We prefer, therefore, to construct the lenses 26 and 27 of a length considerably shorter than the length of the tape to be projected and of a width somewhat greater than the width of the tape. For instance, in projecting a 7½ inch length of tape the lenses 26 and 27 may have a length of approximately 4 inches and a width of approximately 2 inches. These lenses serve to partially condense the beam, the light rays disposed in vertical planes being brought substantially parallel, as shown in Fig. 12, and those in horizontal planes diverging to the full length of the tape. A third lens 28 of plano-convex form is interposed in the path of the beam and serves to further condense the beam substantially to the dimensions of the tape 17.

For convenience, in the location of the translucent screen 27, the elliptical beam emanating from the lens 28 is reflected vertically upwards by a rectangular mirror 31.

Referring to Fig. 2 the tape 17 is drawn from a supply reel 32 and passes beneath the type wheel 33 of the receiving printer at which point the quotations are impressed thereon by means of the platen 34. A loop of tape 35 is permitted to form between the printer and the tape support 36 located in the path of the light beam, and in this loop rides a roller 37 carried by a contact arm 38. A tape snubber comprising a cam member 39 and a roller 40 is adapted to engage the tape to arrest its motion whenever the loop 35 decreases to a predetermined size and to release the tape when the loop increases to a predetermined greater size. The snubber is controlled by a pair of opposed electromagnets 41 and 42, the circuits of which are completed selectively in accordance with the position of the contact arm 38. The tape is drawn across the support 36 by a feed roller 43 driven by continuously operated motor through a slip clutch not shown, and is taken up on the reel 44.

In order to obtain a wide angle beam from the objective lens system 45, we preferably position a cylindrical lens 46 immediately beneath the tape. The curvature of the lens 46 is such as to diverge the image lengthwise of the tape towards the objective lens, whereas the transverse image of the tape is not materially altered thereby. A spherical lens, however, may be employed in place of the cylindrical lens 46. From the objective lens system 45 the image is projected upon a pair of angularly disposed mirrors 47 and 48 and thence on to the back of the translucent screen 49.

It is understood, of course, that the entire printing and projecting system may be enclosed in a suitable cabinet such as shown in patent to Dirkes, No. 1,684,309, granted September 11, 1928, and that various modifications and changes may be made in the system without departing from the essential attributes of the invention. For instance, an opaque tape may be employed and the image reflected therefrom on to the screen as shown in application of E. R. Wheeler, Serial No. 380,387, filed July 23, 1929.

It is to be noted that we have devised an illuminating system which causes a more even distribution of light and greater concentration thereof on to the tape, and which enables a greater length of tape to be projected satisfactorily than heretofore, without increasing the intensity or nature of the light source. While we have shown the lens 26 as truly cylindrical, it is to be understood, of course, that the longitudinal elements thereof may be slightly convex, but of a larger radius than the transverse elements, whereby the concentration of light is greater transversely than longitudinally of the tape. It should be further noted that the lenses 26 and 46 have this common property of condensing the light onto the tape more in one direction than in the other, the latter condensing the light longitudinally of the tape to increase the divergency of the objective rays so as to enable the image to cover a longer screen.

What we claim is:

1. In a tape projector the combination of a tape having markings thereon, a light source, a condensing lens system intermediate the light source and tape including a lens having a substantially cylindrical surface, the axis of which is parallel to the longitudinal elements of the tape, the radius of curvature of said cylindrical surface and the relation of the major to the minor axes of the lens being such that a substantially elliptical light beam is produced, the length of which is many times its width and which approximates the shape of the tape projected at any instant.

2. In a tape projector the combination of a tape having markings thereon, a light source, a condensing lens system intermediate the light source and tape including a lens, one surface of which is composed of linear elements substantially parallel to the longitudinal axis of the tape, said surface being convex in planes transversely of the tape the curvature of said convex surface and the proportions of said lenses being such that light from said source is diverged on to the tape, longitudinally thereof, and is converged on to the tape transversely thereof.

3. In a tape projector the combination of a tape having markings thereon, a light source, a condensing lens system intermediate the light source and tape for illuminating an elongated area of the tape including a lens, one surface of which is composed of linear elements substantially parallel to the longitudinal axis of the tape, said surface being convex in planes transversely of the tape, and a second lens surface intermediate the light source and the tape which is convex both longitudinally and transversely of the tape said lens having a length along its linear elements less than the length of the tape to be illuminated at any instant and a width greater than the width of the tape, the radius of curvature of said convex surfaces being such that light from said source is diverged on to the tape, longitudinally thereof, and is converged on to the tape, transversely thereof.

4. In a tape projector the combination of an elongated tape, a light source, and a condensing lens system intermediate the light source and tape for illuminating an elongated area of said tape, said system including a surface forming a portion of the surface of a cylinder, the linear elements of said surface being parallel to but shorter than the length of said area but substantially longer than the cord subtending the curved elements thereof and said cord being greater than the length of said area, whereby an elliptical light beam is obtained having a greater divergency transversely of said linear elements than parallel thereto and a substantially spherical lens surface for directing said light beam upon the tape said spherical lens surface being arranged relative to said cylindrical lens surface so that light is caused to diverge longitudinally of the tape and to converge transversely thereof.

ROBERT F. DIRKES.
FRANCES H. CLARK.